Aug. 23, 1927.

G. E. HITCHCOCK

AUTOMOBILE SIGNAL

Filed May 17, 1922

Inventor;
George E. Hitchcock
By Louis Boegler
his Attys

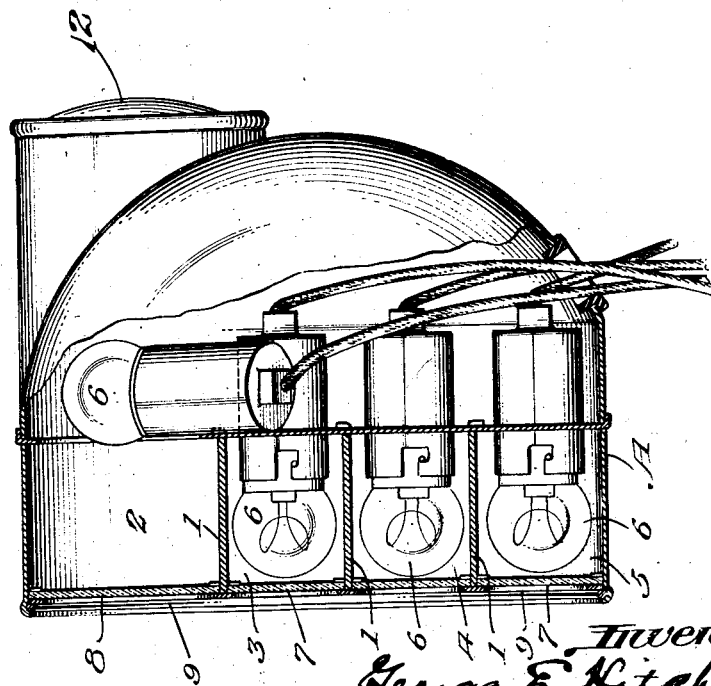

Patented Aug. 23, 1927.

1,640,275

UNITED STATES PATENT OFFICE.

GEORGE E. HITCHCOCK, OF FLINT, MICHIGAN, ASSIGNOR OF ONE-THIRD TO AMBROSE ALFORD, OF FLINT, MICHIGAN.

AUTOMOBILE SIGNAL.

Application filed May 17, 1922. Serial No. 561,752.

My invention relates to a signal for automobiles.

The purpose of this invention is to provide means for signaling from the driver's seat to the rear or other part of the vehicle the direction of turn, when the vehicle is to stop or when parked.

In the accompanying drawings:

Fig. 3 is a side view of the signal casing with parts broken away; and

Fig. 4 is a view of the same from the rear.

Figure 1:
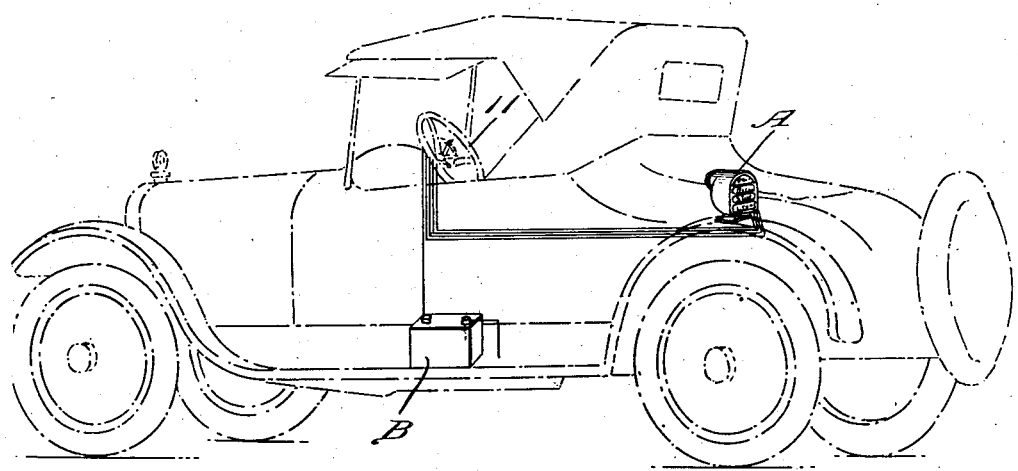
Fig. 1 is a dotted perspective of a vehicle showing diagrammatically how my signal is applied.
Figure 2:
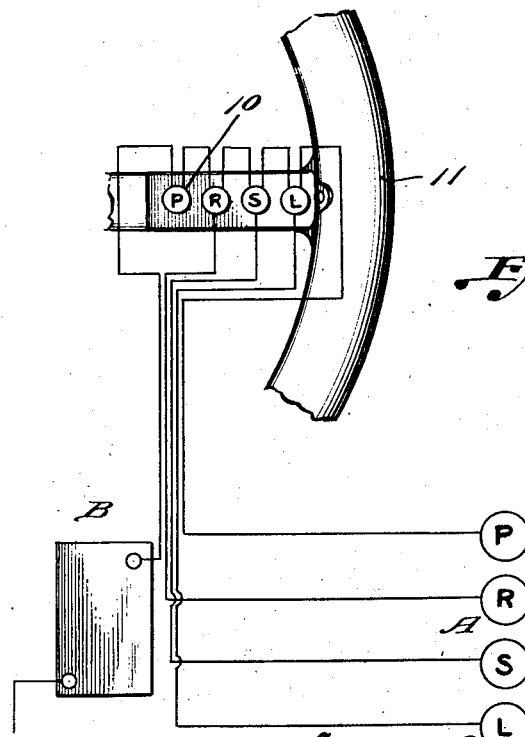
Fig. 2 is a diagram of circuits.

A, represents the casing, preferably stamped from sheet-metal and divided by partitions 1, into several compartments 2, 3, 4 and 5, each of which is supplied with a lamp 6, the rays of which shine through the white or colored glass 7 or 8, and the stencil 9 thereon, to the rear, indicating that the car is parked, or is about to turn or stop as the case may be.

Corresponding buttons 10 on the wheel 11, steering-column, or elsewhere within reach, are provided and the buttons are preferably initialed P, R, S and L.

These are in circuit with the several lamps through the battery B.

Thus when the driver is to stop, he presses the S button; and when the car is to be parked, he presses the P button; and to turn, he presses R or L, accordingly as the turn is to be to right or left.

The signal is so simple it is easily attached, and it is effective.

Opposite the colored parking light is the white light 12, which shines toward the front as shown in Fig. 3.

It is understood the park button P is an on-and-off switch, commonly termed a "lazy button," when pushed the light remains until pushed again to extinguish it. The other buttons are ordinarily push buttons which means the light is extinguished the moment the operator removes his finger from the button.

I claim:

A signal for automobiles including a casing, a vertical partition therein, a plurality of horizontal partitions connected with the vertical partition and the rear of the casing for providing a plurality of closed compartments, glass covering one side of said closed compartments, the upper end of the vertical partition having an opening therein, an elongated compartment above the closed compartments, having glass ends and including the upper part of the partition intermediate its ends, lamps secured to the vertical partition for illuminating the glass sides of the closed compartments and a lamp mounted adjacent the opening in the partition.

In testimony whereof I hereunto affix my signature.

GEORGE E. HITCHCOCK.